Jan. 2, 1934.　　　　　J. SNEED　　　　　1,942,263
STEERING MECHANISM
Original Filed March 22, 1930
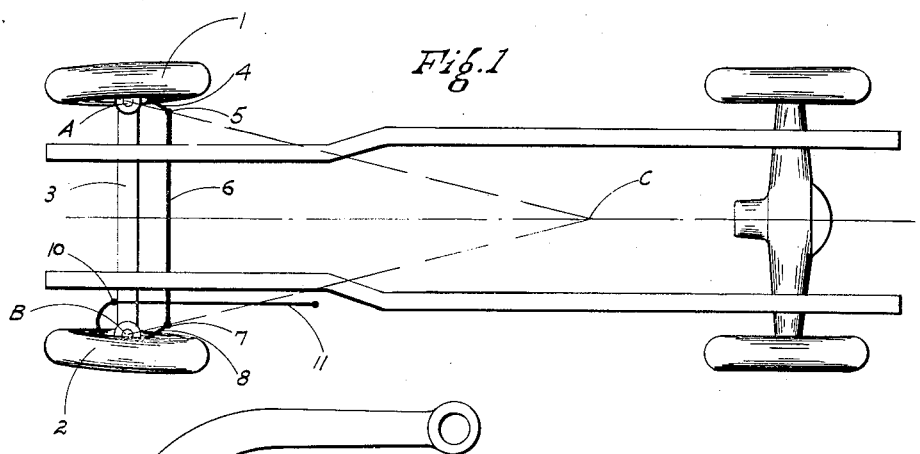
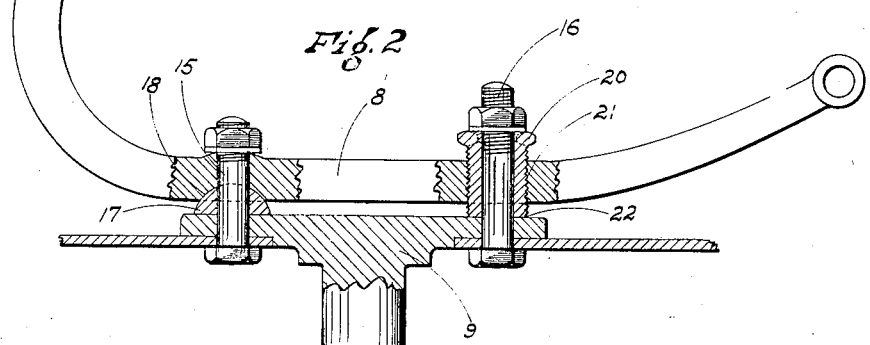
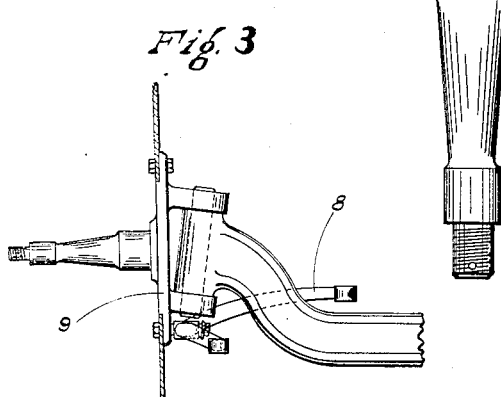
Inventor
JOHN SNEED
By Richey & Watts
Attorney Patented Jan. 2, 1934

1,942,263

UNITED STATES PATENT OFFICE 1,942,263

STEERING MECHANISM

John Sneed, Grosse Pointe, Mich.

Application March 22, 1930, Serial No. 438,112
Renewed November 23, 1932

11 Claims. (Cl. 280—95)

This invention relates to vehicle steering mechanism and more particularly to means for adjusting the position of the steering wheels relative to each other.

In laying out steering mechanism, particularly for automobiles, a triangle is drawn having its base coincident with the front axle and terminating in the centers of the king pins and having its apex in the center of the vehicle near the rear axle. A preferred practice is to locate the apex of the triangle $\frac{7}{10}$th of the distance from the front to the rear axle. The sides of the triangle therefore, extend from the apex to the king pins and the joints between the steering arms and the tie rod are located in the sides of the triangle. All of the foregoing is well known practice and has been evolved for the purpose of facilitating steering of the vehicle.

This theory of layout involves that the steering wheels be positioned relative to each other, i. e. toeing-in the desired amount when the joints between the steering arms and the tie rod lie exactly in the sides of the triangle. It is well known however, that the "toe-in" of the steering wheels comes to need adjustment for various reasons and prior to my invention the practice has been to increase or decrease the effective length of the tie rod with the result that the joints between the steering arms and the tie rod are moved out of the sides of the triangle, i. e. moved from their ideal positions.

My invention contemplates a means for adjusting the "toe-in" of the front wheels without changing the distance between the joints between the steering arms and the ends of the tie rod. In other words, I provide means for adjusting the "toe-in" of the steering wheels which permits the joints between the ends of the tie rod and the steering arms to remain in an ideal position relative to each other at all times.

It is therefore among the objects of my invention to provide a steering mechanism in which the ideal characteristics of its layout may be maintained regardless of the extent of adjustment of the relative position of the steering wheels. A further object is to provide means for adjustably securing at least one of the steering arms relative to the knuckle of one of the steering wheels to which it is attached. A further object is to provide a simple and readily accessible adjusting mechanism. A further object is to provide means whereby the relative position of the steering wheels may be very quickly and very accurately adjusted.

Other objects will appear from the following description of a preferred form of my invention, reference being had to the accompanying drawing. The essential characteristics are summarized in the claims.

In the drawing, Fig. 1 is a diagrammatic layout of the essential elements of a steering mechanism embodied in the vehicle; Fig. 2 is a top plan view partially in section showing one of the steering arms as adjustably secured to one of the steering knuckles; and Fig. 3 is an elevation showing the relation of the steering arms, knuckles and axle.

Referring to the drawing, the steering wheels 1 and 2 are shown to be swivelingly mounted at the ends of a front axle 3. A steering arm 4 secured to the knuckle of the wheel 1 is joined as at 5 in the well known manner, preferably through a ball and socket joint not specifically shown, to one end of a tie rod 6. The other end of the tie rod is similarly joined, as at 7, to a steering arm 8 which in turn is secured to the knuckle 9 (see Figs. 2 and 3) of the steering wheel 2. The steering arm 8, as in the usual practice, is preferably universally connected as at 10 to the forward end of a drag link 11 which is in turn intended to be connected to the steering mechanism in the usual manner.

To facilitate adjustment of the wheels 1 and 2 relative to each other and to define the "toe-in" of the wheels, the steering arm 8 is adjustably secured to the knuckle 9, as shown in Fig. 2. The steering arm 8 is bolted to the knuckle by bolts 15 and 16 and is held by these bolts in fixed relation to the knuckle. The arm is however, normally spaced from the face of the knuckle, as shown in Fig. 2, and is held away from the face of the knuckle adjacent the bolt 15 by a member 17 through which the bolt 15 passes and which presents a rounded arcuate surface 18 for engagement with the complementary surface formed in the arm. Enough clearance is allowed between the bolt 15 and the hole in the arm 8 through which it extends to permit the arm to be rocked, relative to the knuckle, about the center of the arc 18. The bolt 16, as stated above, clamps and locks the arm and holds it in any given position relative to the knuckle. To rock the arm relative to the knuckle about the center of the arc 18, I provide a bushing 20 which is threaded through a tapped hole in the steering arm, as at 21, and which engages the face of the knuckle as at 22. It will thus be seen that when the nut of the bolt 16 is released, the bushing 20 can be turned to move the steering arm relative to the knuckle, rocking it about the center of the arc 18. Thus the relation between the wheels 1 and 2 is determined by turning the bushing 20.

It will be seen the adjustment may simply and quickly be effected by simply backing off the nut of the bolt 16, thereafter turning the bushing to effect the "toe-in" desired, and thereafter drawing up the nut on the bolt 16 to hold the bushing as well as the steering arm in fixed relation to the knuckle. Suitable means such as lock washers are employed to hold the nuts fast on the bolts 15 and 16.

Referring back to Fig. 1, I show the triangle ABC drawn with its base in the front axle, with the points A and B in the centers of the king pins and with its apex C adjacent the rear axle. It will be seen that the joints 5 and 7 between the steering arms and the tie rod lie in the lines AC and BC respectively. Presuming that the triangle ABC is ideal for the purpose described and that it is desirable that the joints 5 and 7 lie in the sides of the triangle, then it will be apparent that the adjustment between the steering arm 8 and the knuckle 9 will not effect the geometry of the layout and will not move either of the joints 5 or 7 from their ideal position.

While the foregoing constitutes a description of a preferred form of my invention, modifications thereof may well occur to those skilled in the art without departing from the spirit thereof and I do not care to be limited in the scope of my patent by this specific disclosure or in any manner other than by the claims appended hereto.

I claim:—

1. In combination a steering knuckle, a steering arm associated therewith, means for pivotally supporting said arm on said knuckle and means for adjustably rocking said arm about said support to change its relation to said knuckle.

2. In combination, a steering knuckle, a steering arm, a bearing member secured between said arm and said knuckle and affording a pivotal support for said arm, and means engaging said arm and said knuckle at a point removed from said bearing member for adjustably positioning the arm relative to the knuckle.

3. In combination, a steering knuckle, a steering arm therefor, a pair of bolts for securing said arm to said knuckle, and a member in threaded engagement with said arm and contacting with said knuckle for adjustably spacing said arm from said knuckle.

4. In combination, a steering knuckle, a steering arm associated therewith, a bearing member having arcuate contact with at least one of said parts and secured between them, an externally threaded bushing extending through said arm and in threaded engagement therewith at a point removed from said bearing member and contacting with said knuckle and adjustably positioning said arm relative to said knuckle.

5. In combination, a steering knuckle, a steering arm associated therewith, means affording a pivotal support for said arm on said knuckle, an externally threaded bushing extending through and in threaded engagement with said arm at a point spaced from said means, said bushing contacting with said knuckle and spacing said arm therefrom, means for rotating said bushing to vary the spacing of the arm from the knuckle adjacent thereto by rocking it about said first named means, a bolt extending through said knuckle and through said bushing and a nut on said bolt engaging said bushing for securing said arm to said knuckle and holding said bushing against rotation.

6. In combination, a steering knuckle, a steering arm associated therewith, said knuckle presenting a flat surface adjacent said steering arm, said steering arm having a pair of spaced holes, one being threaded, and the other terminating in an arcuate bearing portion formed in the arm and facing the knuckle, an apertured bearing member disposed between said arm and said knuckle and engaging the bearing portion in said arm, a bolt extending through said knuckle, bearing member and arm and clamping the bearing member between the arm and the knuckle, an internally threaded bushing threaded in the threaded hole in said arm and extending beyond the arm and engaging the surface of said knuckle at a point spaced from said bearing member, and a bolt extending through said knuckle and said bushing for securing said arm to said knuckle and holding said bushing against rotation.

7. In a vehicle having steering wheels mounted on swiveling knuckles, the combination of steering arms associated with said knuckle, a tie rod joining the ends of said steering arms and holding the ends of said steering arms a fixed distance apart, and means exclusive of said tie rod and not effecting the distance between the ends of said steering arms for varying the position of said steering wheels relative to each other comprising means for changing the relation between at least one of said steering arms and its knuckle.

8. In combination a steering knuckle, a steering arm associated therewith, means for pivotally supporting said arm on said knuckle and means spaced from said first named means and in alignment therewith for adjustably rocking said arm about said support to change its relation to said knuckle.

9. The combination of elements for adjustably positioning the steering wheels of a motor vehicle relative to each other, which consists in a swivelling knuckle for each wheel mounted to swivel about a fixed axis at the opposite ends of an axle, a steering arm for each wheel mounted on each knuckle, a tie rod connecting the ends of said arms, and means for changing the angular position of at least one of said arms with respect to the knuckle upon which it is mounted.

10. The combination of elements for adjustably positioning the steering wheels of a motor vehicle relative to each other, which consists in a swivelling knuckle for each wheel mounted to swivel about a fixed axis at the opposite ends of an axle, a steering arm for each wheel mounted on each knuckle, a tie rod connecting the ends of said arms, and means for changing the angular positional relation between at least one of the steering wheels and its associated steering arm.

11. In a vehicle steering mechanism, the combination of a pair of steering wheels, knuckles upon which said wheels are mounted, steering arms secured to said knuckles, a tie rod joining said steering arms, and means associated with at least one of said steering arms and independent of said tie rod for varying the position of said steering wheels with relation to each other.

JOHN SNEED.